(12) United States Patent
Kokubo et al.

(10) Patent No.: US 11,393,223 B2
(45) Date of Patent: Jul. 19, 2022

(54) PERIPHERY MONITORING DEVICE

(71) Applicant: AISIN CORPORATION, Kariya (JP)

(72) Inventors: Yoshihito Kokubo, Kariya (JP); Yoshihisa Suetsugu, Kariya (JP)

(73) Assignee: AISIN CORPORATION, Kariya (JP)

( * ) Notice: Subject to any disclaimer, the term of this patent is extended or adjusted under 35 U.S.C. 154(b) by 99 days.

(21) Appl. No.: 16/676,584

(22) Filed: Nov. 7, 2019

(65) Prior Publication Data

US 2020/0151466 A1 May 14, 2020

(30) Foreign Application Priority Data

Nov. 8, 2018 (JP) .............................. JP2018-210710

(51) Int. Cl.
*G06V 20/56* (2022.01)
*G06K 9/62* (2022.01)

(52) U.S. Cl.
CPC ......... *G06V 20/588* (2022.01); *G06K 9/6256* (2013.01); *G06V 2201/07* (2022.01)

(58) Field of Classification Search
CPC .. G06K 9/00791; G06K 9/00798; G06K 9/40; G06K 9/6256; G06K 9/6298; G06K 2209/21
See application file for complete search history.

(56) References Cited

U.S. PATENT DOCUMENTS

| | | | |
|---|---|---|---|
| 9,454,703 B2* | 9/2016 | Einecke | G06V 20/56 |
| 10,339,812 B2* | 7/2019 | Tamer | G06T 11/60 |
| 10,755,384 B2* | 8/2020 | Akiyama | G06T 5/001 |
| 2005/0035926 A1* | 2/2005 | Takenaga | B60S 1/0818 |
| | | | 345/8 |
| 2014/0009618 A1* | 1/2014 | Imai | G06V 20/588 |
| | | | 348/148 |

(Continued)

FOREIGN PATENT DOCUMENTS

JP 2017-92622 A 5/2017

OTHER PUBLICATIONS

J. Mukherjee, K. Praveen and V. Madumbu, "Visual Quality Enhancement Of Images Under Adverse Weather Conditions," 2018 21st International Conference on Intelligent Transportation Systems (ITSC), Maui, HI, USA, 2018, pp. 3059-3066, doi: 10.1109/ITSC.2018.8569536. (Year: 2018).*

(Continued)

*Primary Examiner* — Tsung Yin Tsai
(74) *Attorney, Agent, or Firm* — Sughrue Mion, PLLC

(57) ABSTRACT

A periphery monitoring device includes: an acquisition unit that acquires capture images which are captured by an imaging unit in time series when a vehicle is moving, the imaging unit being provided in the vehicle and capable of imaging surroundings of the vehicle; and a restoration processing unit that, in a case where dirt is present in a latest capture image among the capture images, inputs the capture images into a first learned model and generates a first restoration image as a restoration image obtained by restoring a region concealed with the dirt in the latest capture image, the first learned model being a result obtained by machine learning a relationship between a first learning image in which learning dirt is not present and first learning dirt images each of which is made by causing the learning dirt to be present in the first learning image.

6 Claims, 6 Drawing Sheets

(56) References Cited

U.S. PATENT DOCUMENTS

| | | | | |
|---|---|---|---|---|
| 2014/0010408 | A1* | 1/2014 | Irie | G06T 7/0002 |
| | | | | 382/103 |
| 2014/0232869 | A1* | 8/2014 | May | G06T 7/70 |
| | | | | 348/148 |
| 2016/0364620 | A1* | 12/2016 | Akiyama | H04N 7/188 |
| 2018/0315167 | A1* | 11/2018 | Akiyama | G06V 10/98 |
| 2019/0174029 | A1* | 6/2019 | Mandai | G06T 7/00 |

OTHER PUBLICATIONS

D. Eigen, D. Krishnan and R. Fergus, "Restoring an Image Taken through a Window Covered with Dirt or Rain," 2013 IEEE International Conference on Computer Vision, Sydney, NSW, Australia, 2013, pp. 633-640, doi: 10.1109/ICCV.2013.84. (Year: 2013).*

H. Porav, T. Bruls and P. Newman, "I Can See Clearly Now: Image Restoration via De-Raining," 2019 International Conference on Robotics and Automation (ICRA), Montreal, QC, Canada, 2019, pp. 7087-7093, doi: 10.1109/ICRA.2019.8793486. (Year: 2019).*

M. Uřičář et al., "Desoiling Dataset: Restoring Soiled Areas on Automotive Fisheye Cameras," 2019 IEEE/CVF International Conference on Computer Vision Workshop (ICCVW), Seoul, Korea (South), 2019, pp. 4273-4279, doi: 10.1109/ICCVW.2019.00526. (Year: 2019).*

Zhao, G., Liu, J., Jiang, J. et al. A deep cascade of neural networks for image inpainting, deblurring and denoising. Multimed Tools Appl 77, 29589-29604 (2018). https://doi.org/10.1007/s11042-017-5320-7 (Year: 2017).*

Jahojit Mukherjee teaches "Visual Quality Enhancement Of Images Under Adverse Weather Conditions" (Year: 2018).*

Jahojit Mukherjee et al ("Visual Quality Enhancement Of Images Under Adverse Weather Condition") (Year: 2018).*

* cited by examiner

PERIPHERY MONITORING DEVICE

CROSS REFERENCE TO RELATED APPLICATIONS

This application is based on and claims priority under 35 U.S.C. § 119 to Japanese Patent Application 2018-210710, filed on Nov. 8, 2018, the entire contents of which are incorporated herein by reference.

TECHNICAL FIELD

An embodiment of this disclosure relates to a periphery monitoring device.

BACKGROUND DISCUSSION

In the related art, there is a system that displays a capture image based on capture image data captured by an imaging unit (camera) installed in a vehicle on a display device so that a driver or the like recognizes a situation of the periphery of a vehicle, or that performs obstacle detection and approach detection based on the capture image data. In such a system, in a case where dirt such as raindrops, dust, or mud splashes adheres to an imaging surface (for example, a lens) of the imaging unit, dirt is reflected on the capture image, and appropriate image display cannot be performed, or appropriate image processing and detection processing using the capture image cannot be performed. Therefore, a system has been proposed that performs image processing on a capture image and generates a restoration image in which the dirt is removed to display the restoration image or to use the restoration image for other processing.

However, a restoration image of a system of JP 2017-92622A (Reference 1) is an image restored from one capture image, and the restoration image may not necessarily match a real-world environmental situation. For example, in a case where an object that is photographed only at a dirt portion (an object concealed with dirt) is present, the object is not reproduced in the restoration image, and reliability of the restoration image may be reduced. As a result, for example, in a case where the restoration image is displayed on a display device as periphery information to be provided to a user, accurate information may not be presented. In addition, in a case where the restoration image (data) is used for periphery monitoring (for example, obstacle detection or the like) on surroundings of the vehicle, monitoring reliability may be lowered. Therefore, if it is possible to provide a periphery monitoring device that can generate a restoration image that is closer to the real-world environment situation, it is meaningful to improve a quality of provided information and accuracy of periphery monitoring.

SUMMARY

A periphery monitoring device according to an embodiment of this disclosure includes: an acquisition unit that acquires a plurality of capture images which are captured by an imaging unit in time series when a vehicle is moving, the imaging unit being provided in the vehicle and capable of imaging surroundings of the vehicle; and a restoration processing unit that, in a case where dirt is present in a latest capture image among the plurality of capture images, inputs the plurality of capture images into a first learned model and generates a first restoration image as a restoration image obtained by restoring a region concealed with the dirt in the latest capture image, the first learned model being a result obtained by machine learning a relationship between a first learning image in which learning dirt is not present and a plurality of first learning dirt images each of which is made by causing the learning dirt to be present in the first learning image. According to this configuration, for example, a restoration image is generated by inputting a plurality of capture images which are captured during movement of the vehicle into the first learned model and are continuous in time series, and thus in the past capture images obtained by tracing back in time series even in the region concealed with the dirt in the latest capture image, there is a high possibility that the region is not concealed with the dirt. As a result, it is possible to improve restoration properties of a dirt region of the latest capture image and generate a restoration image that is closer to a real-world environment.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an exemplary embodiment of this disclosure will be disclosed. A configuration of the embodiments shown below, and operations, results, and effects provided by the configuration are examples. This disclosure can be realized by configurations other than the configuration disclosed in the following embodiment, and can obtain at least one of various effects based on a basic configuration and derivative effects.

For example, in a case where dirt adheres to a lens of an imaging unit equipped in a vehicle and the dirt is reflected on a capture image, a periphery monitoring device of the present embodiment generates an image in which the dirt is removed, that is, a restoration image obtained by restoring a state where the dirt is not present. Then, by using the restoration image, a periphery monitoring function in the periphery monitoring device is improved.

Figure 1:
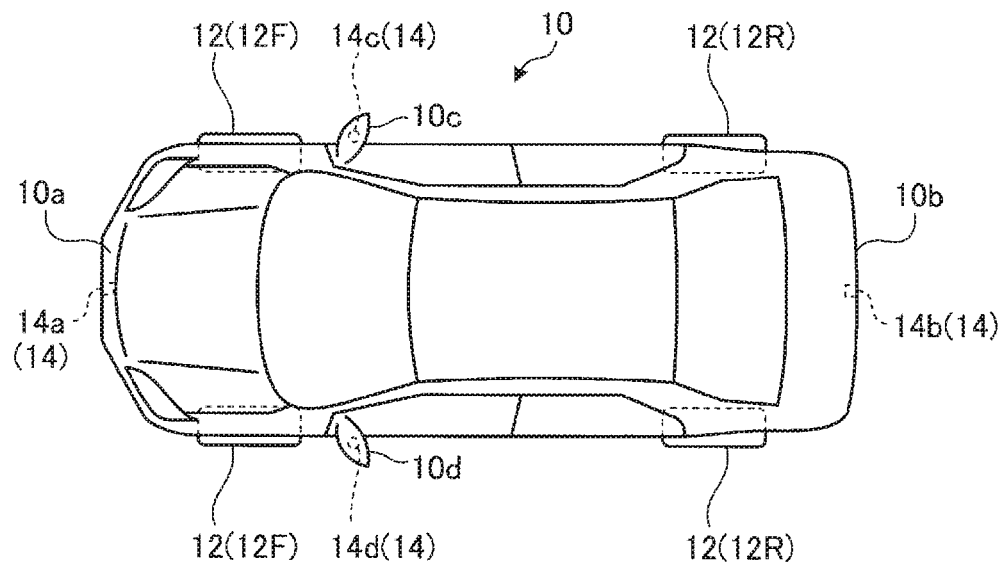
FIG. 1 is a schematic plan view showing an example of a vehicle which can be equipped with a periphery monitoring device according to an embodiment.

FIG. 1 is a schematic plan view of a vehicle 10 which is equipped with the periphery monitoring device of the present embodiment. The vehicle 10 may be, for example, an automobile (an internal combustion engine automobile) using an internal combustion engine (an engine, not shown) as a drive source, may be an automobile (an electric vehicle, a fuel cell vehicle, or the like) using an electric motor (a motor, not shown) as a drive source, or may be an automobile (hybrid vehicle) using both of them as drive sources. In addition, the vehicle 10 can be equipped with various transmissions, and can be equipped with various devices (systems, components, or the like) necessary for driving the internal combustion engine and the electric motor. In addition, a system, the number, a layout, and the like of devices relating to driving of vehicle wheels 12 (front vehicle wheels 12F, rear vehicle wheels 12R) in the vehicle 10 can be set in various ways.

As illustrated in FIG. 1, the vehicle 10 is provided with, for example, four imaging units 14a to 14d as a plurality of imaging units 14. Each of the imaging units 14 is a digital camera that incorporates an imaging element such as a charge coupled device (CCD) or a CMOS image sensor (CIS). Each of the imaging units 14 can output moving image data (capture image data) at a predetermined frame rate. Each of the imaging units 14 includes a wide-angle lens or a fish-eye lens, and can capture a range of, for example, 140° to 220° in a horizontal direction. In addition, for example, an optical axis of each of the imaging units 14 (14a to 14d) arranged on an outer peripheral portion of the vehicle 10 may be set to be obliquely downward. Therefore, the imaging units 14 (14a to 14d) sequentially capture an periphery environment outside the vehicle 10 including a road surface on which the vehicle 10 is movable, marks (an arrow, a division line, a parking frame indicating a parking space, a lane separation line, and the like) painted on the road surface, and objects (as obstacles, for example, pedestrians, other vehicles), and output the capture image as capture image data.

The imaging unit 14a is provided on, for example, a front side of the vehicle 10, that is, a front side in a vehicle longitudinal direction and at a substantially central end in a vehicle width direction, for example, a front bumper 10a, a front grill, or the like, and can capture a front image including a front end (for example, the front bumper 10a) of the vehicle 10. In addition, the imaging unit 14b is provided on, for example, a rear side of the vehicle 10, that is, a rear side in a vehicle longitudinal direction and at a substantially central end in a vehicle width direction, for example, a position above a rear bumper 10b, and can capture a rear region including a rear end (for example, the rear bumper 10b) of the vehicle 10. In addition, the imaging unit 14c is provided at, for example, a right end of the vehicle 10, for example, a right door mirror 10c, and can capture a right side image including a region centered on a right side of the vehicle 10 (for example, a region from a right front to a right rear). The imaging unit 14d is provided at, for example, a left end of the vehicle 10, for example, a left door mirror 10d, and can capture a left side image including a region centered on a left side of the vehicle 10 (for example, a region from a left front to a left rear).

For example, with respect to respective capture image data obtained by the imaging units 14a to 14d, arithmetic processing and image processing are performed, respectively, thereby it is possible to display an image in each direction of surroundings of the vehicle 10 or to execute periphery monitoring. In addition, by executing arithmetic processing and image processing based on respective capture image data, it is possible to generate an image with a wider viewing angle, to generate and display a virtual image obtained by viewing the vehicle 10 from a top, a front, a side, or the like (a bird's-eye view image (a planar image), a side view image, a front view image, or the like), or to perform periphery monitoring.

As described above, the capture image data captured by respective imaging units 14 are displayed on a display device in a vehicle interior in order to provide a user such as a driver with a situation of surroundings of the vehicle 10. In addition, the capture image data are provided to a processing device (a processing unit) that performs various types of detection and sensing, and can be used to control the vehicle 10.

Figure 2:
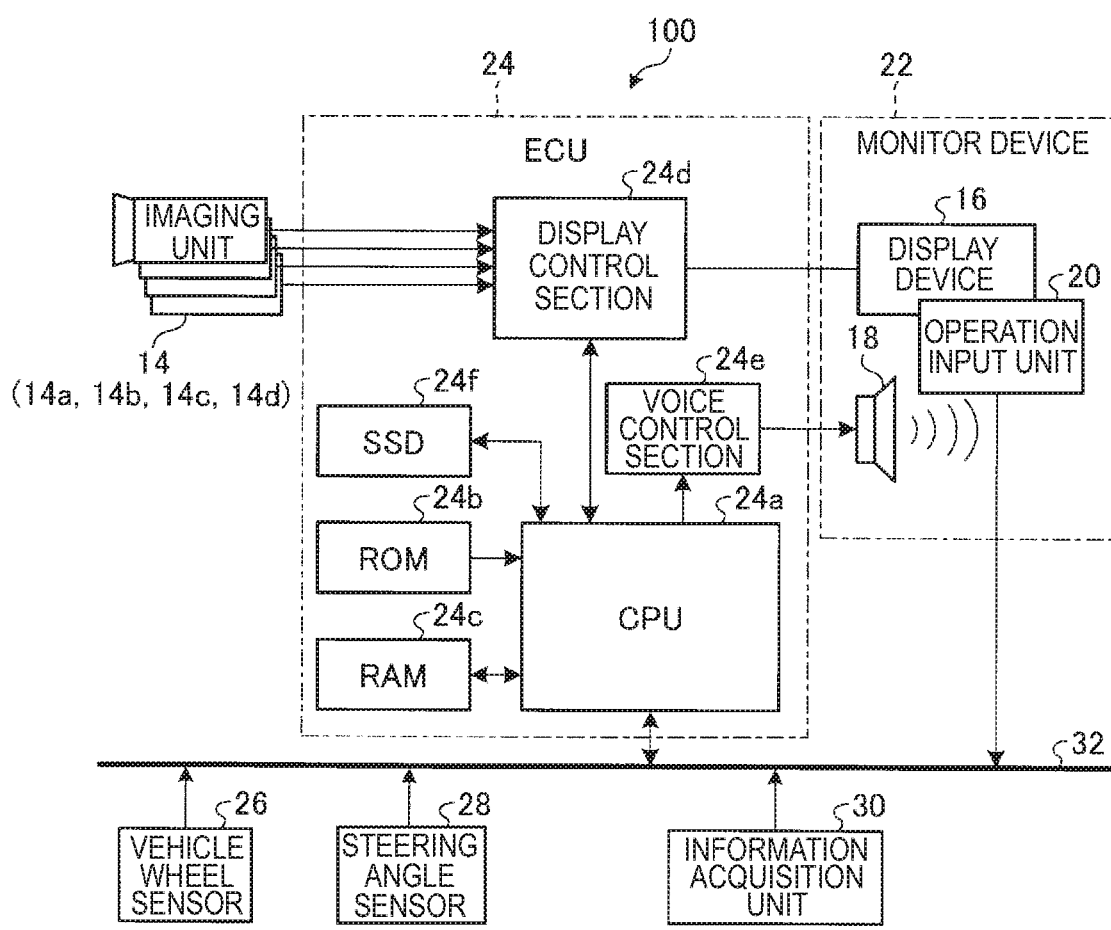
FIG. 2 is an exemplary block diagram of a configuration of a vehicle control system including the periphery monitoring device according to the embodiment.

FIG. 2 is an exemplary block diagram of a configuration of a vehicle control system 100 including the periphery monitoring device equipped in the vehicle 10. A display device 16 and a voice output device 18 are provided in the vehicle interior of the vehicle 10. The display device 16 is, for example, a liquid crystal display (LCD) or an organic electroluminescent display (OELD). The voice output device 18 is, for example, a speaker. In addition, the display device 16 is covered with a transparent operation input unit 20 such as a touch panel, for example. A user (for example, a driver) can visually recognize an image displayed on a display screen of the display device 16 via the operation input unit 20. In addition, the user can execute an operation input by operating such as touching the operation input unit 20 with a finger or the like at a position corresponding to the image displayed on the display screen of the display device 16, pushing the operation input unit with the finger, or moving the finger. The display device 16, the voice output device 18, the operation input unit 20, and the like are provided in, for example, a monitor device 22, the monitor device being located in, for example, a central portion of a dashboard of the vehicle 10 in a vehicle width direction, that is, a left-right direction. The monitor device 22 can have an operation input unit (not shown) such as a switch, a dial, a joystick, and a push button. The monitor device 22 can be used also as, for example, a navigation system or an audio system.

In addition, as illustrated in FIG. 2, the vehicle control system 100 (including the periphery monitoring device) includes an electronic control unit (ECU) 24, a vehicle wheel sensor 26, a steering angle sensor 28, an information acquisition unit 30, and the like, in addition to the imaging units 14 (14a to 14d) and the monitor device 22. In the vehicle control system 100, the ECU 24, the monitor device 22, the vehicle wheel sensor 26, the steering angle sensor 28, the information acquisition unit 30 and the like are electrically connected to one another via an in-vehicle network 32 as an electric communication line. The in-vehicle network 32 is configured as, for example, a controller area network (CAN). The ECU 24 can control various systems by sending a control signal through the in-vehicle network 32. In addition, the ECU 24 can receive information such as operation signals of the operation input unit 20 and various switches, detection signals of various sensors such as the vehicle wheel sensor 26 and the steering angle sensor 28, and position information that can be acquired by the information acquisition unit 30, via the in-vehicle network 32. Furthermore, various systems (a steering system, a brake system, a drive system, and the like) and various sensors for traveling the vehicle 10 are connected to the in-vehicle network 32, but in FIG. 2, configurations that are not essential in the periphery monitoring device of the present embodiment are not shown and description thereof is omitted.

The ECU 24 transmits, to the monitor device 22, data relating to a periphery image and the like generated based on the capture image data acquired from the imaging unit 14 and a voice. The ECU 24 has, for example, a central processing unit (CPU) 24a, a read only memory (ROM) 24b, a random access memory (RAM) 24c, a display control section 24d, a voice control section 24e, a solid state drive (SSD, flash memory) 24f, and the like.

The CPU 24a reads a program stored (installed) in a non-volatile storage device such as the ROM 24b, and executes arithmetic processing according to the program. The ROM 24b stores each program, parameters necessary for execution of the program, a learned model which is used when a capture image is duplicated, and which is obtained by learning in advance using a plurality of data, and the like. The RAM 24c is used as a work area when the CPU 24a executes restoration processing of a restoration image, and is used as a temporary storage area for various data to be used in arithmetic by the CPU 24a (capture image data captured sequentially (in time series) by the imaging unit 14, and the like). In addition, the display control section 24d mainly executes synthesis of image data to be displayed on the display device 16, and the like in the arithmetic processing by the ECU 24. In addition, the voice control section 24e mainly executes processing of voice data to be output by the voice output device 18 in the arithmetic processing by the ECU 24. The SSD 24f is a rewritable nonvolatile storage unit, and can store data even in a case where a power supply of the ECU 24 is turned off. Furthermore, the CPU 24a, the ROM 24b, the RAM 24c, and the like can be integrated in the same package. In addition, the ECU 24 may have a configuration in which another logical arithmetic processor such as a digital signal processor (DSP), a logic circuit, or the like is used instead of the CPU 24a. In addition, a hard disk drive (HDD) may be provided instead of the SSD 24f, and the SSD 24f or the HDD may be provided separately from the ECU 24.

The vehicle wheel sensor 26 is a sensor that detects the amount of rotations or the number of rotations per unit time of the vehicle wheel 12. The vehicle wheel sensor 26 is disposed on each vehicle wheel 12 and outputs a vehicle wheel speed pulse number indicating the number of rotations detected by each vehicle wheel 12 as a sensor value. The vehicle wheel sensor 26 can be configured using, for example, a Hall element or the like. The CPU 24a calculates a vehicle speed, an acceleration, and the like of the vehicle 10 based on the detection value acquired from the vehicle wheel sensor 26, and executes various controls. In a case of calculating the vehicle speed of the vehicle 10 based on the detection value of each vehicle wheel sensor 26, the CPU 24a determines a vehicle speed of the vehicle 10 based on the vehicle speed of the vehicle wheel 12 having the smallest detection value among four vehicle wheels, and executes various controls. Furthermore, the vehicle wheel sensor 26 may be provided in a brake system that is not shown. In that case, the CPU 24a may acquire the detection value of the vehicle wheel sensor 26 via the brake system.

The steering angle sensor 28 is, for example, a sensor that detects a steering amount of a steering unit such as a steering wheel. The steering angle sensor 28 is configured using, for example, a Hall element or the like. The CPU 24a acquires, from the steering angle sensor 28, a steering amount of the steering unit by the driver, a steering amount of the front vehicle wheels 12F at the time of automatic steering when executing parking assistance, and the like, and executes various controls.

The information acquisition unit 30 can acquire a current position of the vehicle 10 by receiving a global positioning system (GPS) signal transmitted from a GPS and the like, or acquire weather information transmitted by an external information center and the like and uses the acquired information for various controls. Furthermore, in a case where the monitor device 22 provides a navigation system, the position information, external information, or the like of the vehicle 10 may be acquired by the navigation system side.

Figure 3:
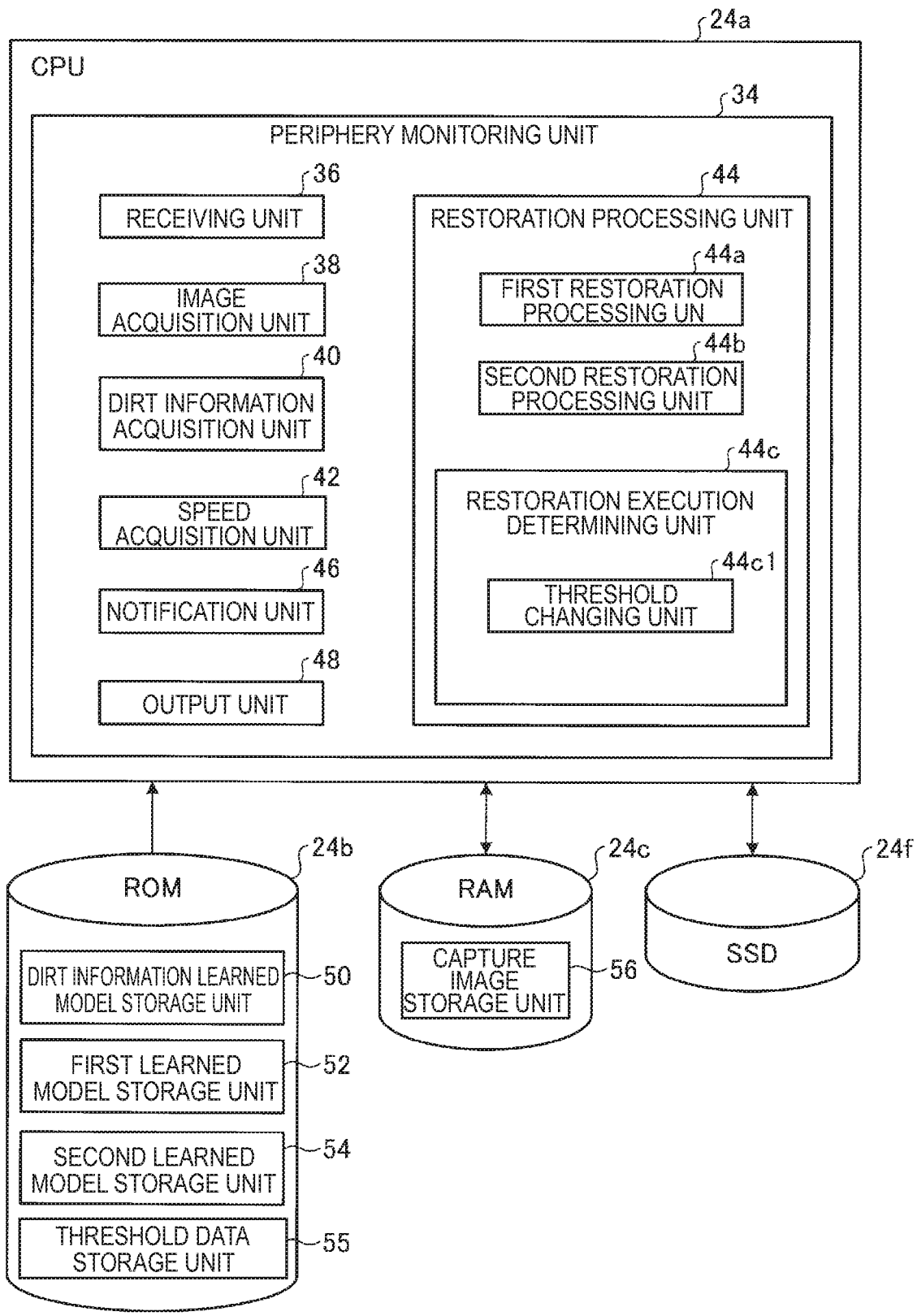
FIG. 3 is a block diagram exemplarily showing a configuration in a case where the periphery monitoring device (a periphery monitoring unit) according to the embodiment is realized by a CPU.

In the present embodiment, in a case where dirt is present in the capture image captured by the imaging unit 14, the ECU 24 manages generation processing (restoration processing) of an image in which the dirt is removed from the capture image, that is, a "restoration image" obtained by restoring a state where the dirt is not present by hardware and software (control program) being cooperated with each other. FIG. 3 is a block diagram exemplarily showing a configuration in a case where the periphery monitoring device (a periphery monitoring unit 34) according to the embodiment is realized in a CPU 24a included in the ECU 24.

The periphery monitoring unit 34 includes various modules for realizing a restoration processing function for generating a restoration image in which dirt present in the capture image is removed. For example, the periphery monitoring unit 34 includes a receiving unit 36, an image acquisition unit 38, a dirt information acquisition unit 40, a speed acquisition unit 42, a restoration processing unit 44, a notification unit 46, an output unit 48, and the like. These modules may be configured as dedicated hardware. Furthermore, as will be described later, since processing using deep learning or the like executed by the restoration processing unit 44 requires enormous parallel computation, for example, a graphics processing unit (GPU), a field-programmable gate array (FPGA), or the like may be used. The periphery monitoring unit 34 includes modules for executing obstacle detection, white line detection, and the like as actual periphery monitoring processing, but, in FIG. 3, illustrations are omitted except for modules necessary for restoration processing and description thereof is omitted. In addition, the restoration processing unit 44 includes detailed modules such as a first restoration processing unit 44a, a second restoration processing unit 44b, and a restoration execution determining unit 44c, and the restoration execution determining unit 44c further includes a threshold changing unit 44c1.

The ROM 24b stores a plurality of learned models previously constructed by machine learning in addition to various programs to be executed by the CPU 24a. The ROM 24b includes, for example, a dirt information learned model storage unit 50, a first learned model storage unit 52, a second learned model storage unit 54, and the like. The dirt information learned model storage unit 50 stores a dirt information learned model to be used in a case of acquiring dirt information such as whether or not dirt is present in the capture image and a position or a size of dirt in a case where dirt is present in the capture image. The first learned model storage unit 52 stores a first learned model to be used in a case where the restoration processing unit 44 generates a first restoration image. The second learned model storage unit 54 stores a second learned model to be used in a case of further improving accuracy of a first restoration image restored using a first learned model. Furthermore, the ROM 24b includes a threshold data storage unit 55 that stores a threshold that is referred to in a case where the restoration processing unit 44 determines whether or not to execute the restoration processing. In addition, the RAM 24*c* includes a capture image storage unit 56 that temporarily stores a plurality of capture image data captured in time series as capture images to be used in a case where the restoration processing unit 44 generates a restoration image.

The dirt information learned model stored in the dirt information learned model storage unit 50 is a model for calculating a probability that dirt (for example, raindrops or the like) is present in a capture image to be restored for each pixel, the probability being used in the dirt information acquisition unit 40. In a case of constructing the dirt information learned model, for example, a value indicating no dirt is set to "0", and a value indicating dirt is set to "1". Then, the probability of dirty of a learning image for each pixel is indicated by an evaluation value of "0 to 1". The dirt information learned model is constructed by learning by a machine learning method such as deep learning based on the learning image formed using the evaluation value. Therefore, by inputting the capture image (data) captured by the imaging unit 14 into the dirt information learned model, a quantity of pixels whose evaluation value is close to "1" is determined, and the position of dirt or the size of dirt (a size of a region) is output.

Figure 4:
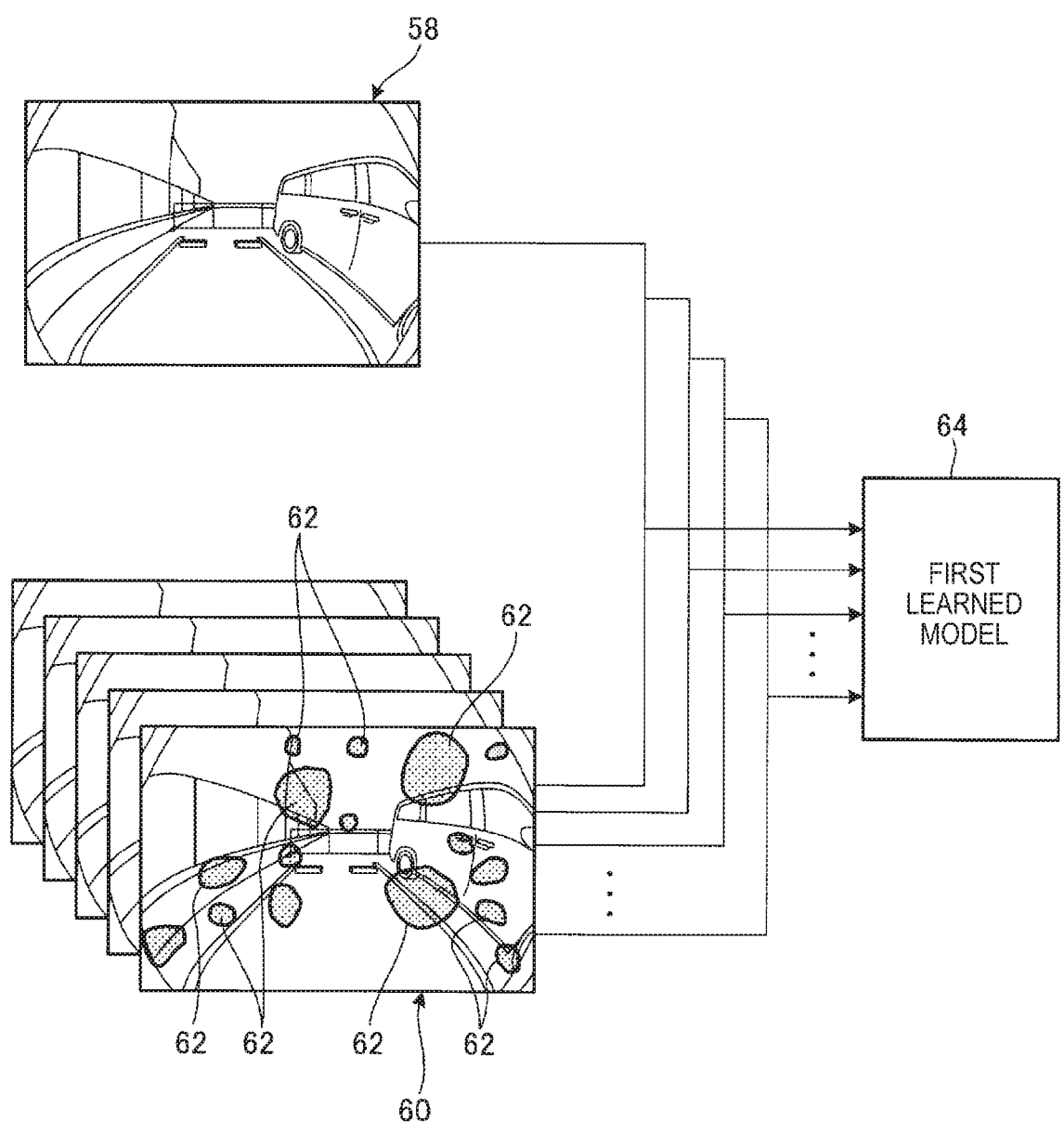
FIG. 4 is an exemplary and schematic explanation diagram showing a learning image of a first learned model in the periphery monitoring device according to the embodiment.

The first learned model stored in the first learned model storage unit 52 is a model to be used by the first restoration processing unit 44*a*. The first learned model is used in a case of generating the first restoration image obtained by restoring a region concealed with dirt in the latest capture image among a plurality of capture images captured in time series by the imaging units 14 provided in the vehicle 10 when the vehicle 10 is moving, as a restoration image. A concept of constructing the first learned model is shown in FIG. 4. As shown in FIG. 4, a first learned model 64 is a model obtained by learning a relationship between a first learning image 58 in which learning dirt 62 (for example, raindrops and the like) is not present and a plurality of first learning dirt images 60 each of which is made by causing learning dirt 62 to be present in the first learning image 58 by a machine learning method such as deep learning, for example. Details of the restoration processing using the first learned model 64 will be described later.

Figure 5:
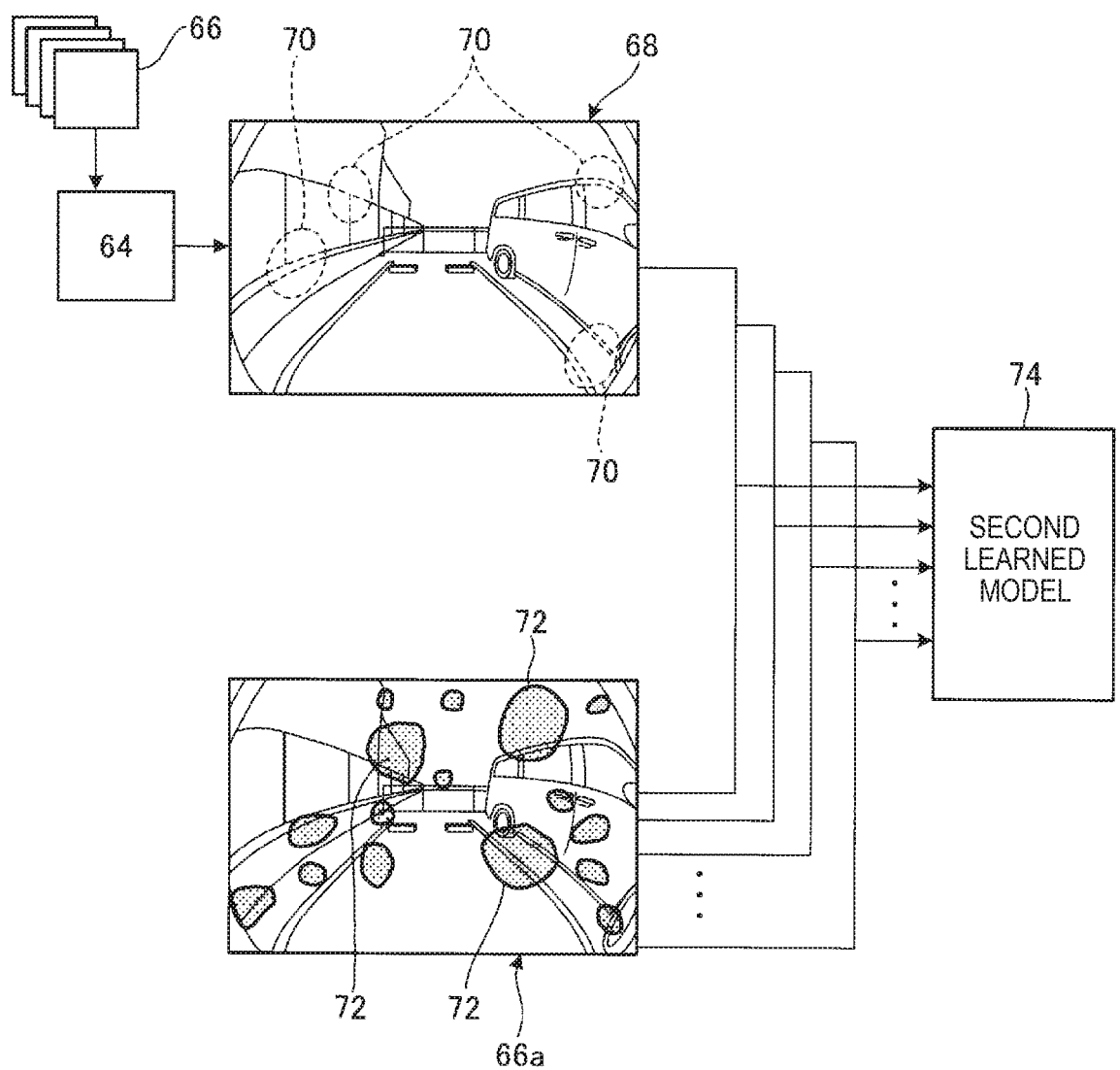
FIG. 5 is an exemplary and schematic explanation diagram showing a learning image of a second learned model in the periphery monitoring device according to the embodiment.

The second learned model stored in the second learned model storage unit 54 is a model to be used by the second restoration processing unit 44*b*. The second learned model is used when restoring a second restoration image having higher restoration accuracy as a restoration image based on the first restoration image generated by the first learned model 64 and the latest capture image among a plurality of capture images input when generating the first restoration image. A concept of constructing the second learned model is shown in FIG. 5. As shown in FIG. 5, the second learned model 74 is a model obtained by learning a relationship between a restoration image 68 (a first restoration image) generated by inputting a plurality of second learning dirt images 66 in which learning dirt is present into the first learned model 64 and the latest learning dirt image 66*a* among the plurality of second learning dirt images 66 used when restoring the restoration image 68 by a machine learning method such as deep learning, for example. The second learned model 74 is for restoring an unnatural region 70 such as blurring or discontinuity that occurs in the restoration image 68 generated by the first learned model 64 using information on a clear portion in the latest learning dirt image 66*a* where dirt 72 is not present (a portion where the edge is clearly represented). Details of the restoration processing using the second learned model 74 will be described later.

Returning to FIG. 3, the receiving unit 36 receives a request signal in a case where generation of a restoration image is requested. For example, the generation of the restoration image may be automatically executed (an automatic restoration mode) in a case where dirt is detected in the capture image while the vehicle 10 is traveling. In addition, the generation of the restoration image may be manually executed (a manual restoration mode) at a timing desired by the user of the vehicle 10 (for example, the driver) via the operation input unit 20 or the like (for example, in a case where it is difficult to regard an image displayed on the display device 16 as being dirty, or the like). In a case where the generation of the restoration image is automatically requested, the receiving unit 36 receives a request signal from the periphery monitoring unit 34 side, and in a case where the generation of the restoration image is manually requested, the receiving unit receives an operation signal from the operation input unit 20 or the like via the in-vehicle network 32.

The image acquisition unit 38 acquires the capture image data captured by respective imaging units 14 for each frame to store the capture image data in the capture image storage unit 56 of the RAM 24*c*. The image acquisition unit 38 can sequentially acquire the capture image data captured by the imaging units 14 in a case where a power supply of the vehicle 10 (ECU 24) is turned on. The image acquisition unit 38 acquires the capture image data captured by respective imaging units 14 (14*a* to 14*d*) by distinguishing the capture image data for each imaging unit 14, to store the capture image data in the capture image storage unit 56. Accordingly, the capture image data are stored in the capture image storage unit 56 as frame data continuous in time series for each imaging unit 14. The capture image storage unit 56 can store capture image data for a certain period, for example, 3 to 5 seconds, and sequentially overwrites new capture image data. Therefore, the capture image storage unit 56 can provide the restoration processing unit 44 with the latest capture image and a plurality of past images obtained by tracing back from the latest capture image in time series for a predetermined period. In addition, as another example of the case where the capture image storage unit 56 stores capture image data for a certain period, for example, the capture image storage unit 56 may store capture image data while the vehicle 10 travels a certain distance.

The dirt information acquisition unit 40 acquires whether or not dirt is present in the capture image and a position or a size of dirt in a case where dirt is present in the capture image by inputting the capture image into the dirt information learned model read from the dirt information learned model storage unit 50 of the ROM 24*b*. The dirt information acquisition unit 40 provides the acquired dirt information to the restoration processing unit 44 sequentially. In a case where dirt is, for example, mud splash or adhesion of dust, even in a case where the vehicle 10 travels, a possibility of moving of the dirt on the lens of the imaging unit 14 is low. On the other hand, in a case where the dirt easily moves or deforms like raindrops or the like, there is a possibility that the dirt moves on the lens of the imaging unit 14 or the size of the dirt changes due to a wind pressure received when the vehicle 10 travels. Therefore, the dirt information acquisition unit 40 sequentially acquires dirt information for each capture image at least while the restoration processing unit 44 executes the restoration processing.

The speed acquisition unit 42 acquires a current vehicle speed or acceleration of the vehicle 10 based on the detection value of the vehicle wheel sensor 26. The speed acquisition unit 42 provides the vehicle speed of the vehicle 10 to the restoration processing unit 44, and the vehicle speed is used in a case where the restoration processing unit 44 determines whether or not to execute the restoration processing.

Figure 6:
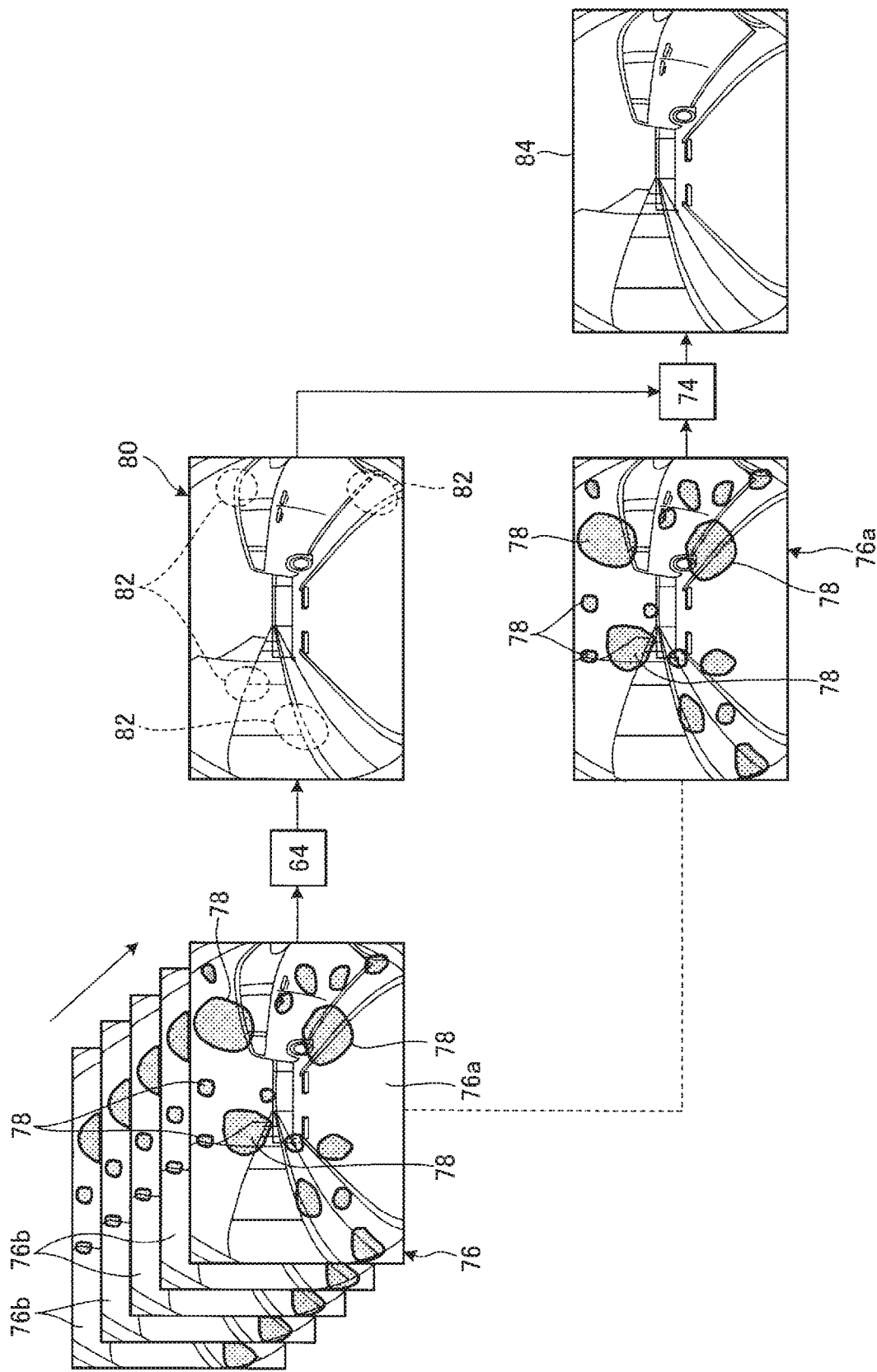
FIG. 6 is an exemplary and schematic explanation diagram showing an image of restoration processing for generating a restoration image in the periphery monitoring device according to the embodiment.

In a case of restoring the capture image to be restored, the restoration processing unit 44 executes two-stage processing using the first restoration processing unit 44a and the second restoration processing unit 44b. FIG. 6 is an exemplary and schematic explanation diagram showing an image in a case where the restoration processing unit 44 executes the restoration processing in two stages using the first restoration processing unit 44a and the second restoration processing unit 44b. Furthermore, FIG. 6 shows an example in which a rear image captured by the imaging unit 14b among the imaging units 14 is restored as a capture image to be restored.

First, the first restoration processing unit 44a inputs a plurality of capture images 76 into the first learned model 64, the capture images being sequentially captured by the imaging unit 14 (the imaging unit 14b) and stored in the capture image storage unit 56 of the RAM 24c in time series. In this case, the dirt information regarding the position or size of the dirt 78 (for example, raindrops) present in the capture image 76 can be recognized based on the dirt information provided from the dirt information acquisition unit 40, and in the first learned model 64, the restoration processing is sequentially executed on a region where a possibility that the dirt 78 is present is high. In this case, the restoration processing is executed on the latest capture image 76a among the plurality of time-series capture images 76. At this time, in past images 76b that were captured by the imaging unit 14 of the traveling vehicle 10 and are past in time series from the latest capture image 76a, there is a possibility that a region concealed with the dirt 78 present on the latest capture image 76a is photographed without being concealed with the dirt 78. Therefore, the first learned model 64 can generate a first restoration image 80 obtained by restoring the region concealed with the dirt 78 in a high probability by inputting the information on a plurality of past images 76b thereinto, to improve a quality of the restoration image.

By the way, as described above, since the first learned model 64 generates the first restoration image 80 using a plurality of past images 76b in addition to the latest capture image 76a, the restoration processing affects to even a region where the dirt 78 is not present, and thus an unnatural region 82 that becomes blurred or discontinuous in the first restoration image 80 may occur. Therefore, the second restoration processing unit 44b inputs the first restoration image 80 generated by the first learned model 64 and the latest capture image 76a among a plurality of capture images 76 used when generating the first restoration image 80 into the second learned model 74, to generate a second restoration image 84. In this case, when the second restoration image 84 is restored, the latest capture image 76a that is most likely to have the most prominent edge with respect to the first restoration image 80 is taken into consideration, so that more clear second restoration image 84 in which the unnatural region 82 is corrected can be generated as the restoration image.

Returning to FIG. 3, the restoration processing unit 44 includes a restoration execution determining unit 44c. As described above, the restoration processing unit 44 executes restoration processing using a plurality of capture images 76 including the latest capture image 76a and the past images 76b. In this case, the past images 76b that can be used for the restoration processing are limited to include an image photographed in the latest capture image 76a. In a case where the vehicle 10 is traveling, for example, the past images are limited to the past images 76b captured several seconds before. As described above, in a situation where the past image 76b that can be used is limited, in a case where the dirt 78 present in the latest capture image 76a is large, even though the restoration processing is executed using a plurality of capture images 76 including the latest capture image 76a and the past images 76b, it may not be able to sufficiently restore. For example, in a case where a size of the dirt 78 exceeds a size indicated by a predetermined threshold, an object that is continuously concealed with the dirt 78 is present in the past images 76b. In such a case, since the region concealed with the dirt 78 in the latest capture image 76a cannot be sufficiently restored, it is not desirable to execute the restoration processing by the restoration processing unit 44. Therefore, the restoration execution determining unit 44c does not execute the restoration processing in a case where a restoration condition is not satisfied. The restoration execution determining unit 44c compares the size of the dirt in the latest capture image 76a which is included in the dirt information acquired by the dirt information acquisition unit 40 with a predetermined threshold; in a case where the size of the dirt is equal to or greater than the threshold, determines that it is not possible to sufficiently restore a dirt portion; and causes the restoration processing in the first restoration processing unit 44a and the second restoration processing unit 44b not to be executed.

Furthermore, in this case, the threshold may be a constant value, but there is a case where the restoration is possible or a case where the restoration is not possible, depending on the speed of the vehicle 10. For example, in a case where a moving speed of the vehicle 10 is high even in a case where the size of the dirt 78 is large, there is a high possibility that the dirt 78 which causes concealment in the latest capture image 76a conceals, in the past images 76b, a position separated from a concealment region of the latest capture image 76a. That is, in a case where a moving amount of the vehicle 10 is large, a possibility that the region concealed with the dirt 78 in the latest capture image 76a is photographed in the past images 76b obtained by tracing back in time series increases. On the contrary, in a case where a moving speed of the vehicle 10 is low even in a case where the size of the dirt 78 is small, a moving amount of the dirt 78 is small in the latest capture image 76a and the past images 76b. Therefore, even though the past images 76b obtained by tracing back in time series are referred to, a possibility that the region concealed with the dirt 78 in the latest capture image 76a remains concealed increases. Therefore, the threshold changing unit 44c1 changes the threshold in a case of determining whether or not restoration is possible, according to the vehicle speed of the vehicle 10 and the size of the dirt 78. The threshold changing unit 44c1 reads a threshold map that associates the vehicle speed of the vehicle 10, the size of the dirt 78, and the threshold with one another, from the threshold data storage unit 55 of the ROM 24b. Then, when executing the restoration processing in the first restoration processing unit 44a and the second restoration processing unit 44b, the threshold changing unit 44c1 acquires the current vehicle speed of the vehicle 10 from the speed acquisition unit 42, acquires the size of the dirt 78 from the dirt information acquired by the dirt information acquisition unit 40, and refers to the threshold map. Then, the threshold changing unit 44c1 determines (changes) the most suitable threshold for determining whether or not restoration is possible in a current situation, and provides the threshold to the first restoration processing unit 44a and the second restoration processing unit 44b. The first restoration processing unit 44a and the second restoration processing unit 44b determine whether or not to execute the restoration processing based on the provided threshold.

The notification unit 46 notifies the user (for example, the driver) that the restoration is being performed in a case where the restoration processing is being performed. As described above, the restoration processing may be performed in the automatic restoration mode or may be performed in the manual restoration mode. In particular, when a restoration image is generated in the automatic restoration mode, the restoration image may be displayed on the display device 16 or may be used for periphery monitoring such as obstacle detection without being noticed by the user. Therefore, by notifying the user that the display of the restoration image or the control based on the restoration image is being executed, the user is caused to be aware of necessity of periphery check while using the restoration image, to improve a user's sense of security in a case of using the restoration image. For example, the notification can be performed by displaying a text message or an icon on the display device 16 or making a display aspect of the display device 16 (such as changing a background color or a frame color) different from that when the restoration processing is not executed. In addition, the notification may be performed in combination with voice notification using the voice output device 18. Furthermore, in a case of performing voice notification, it is desirable to limit the number of voice notification or gradually decrease a volume of voice so as not to cause excessive notification. In the manual restoration mode, the user recognizes the execution of the restoration processing, and thus, basically, the notification by the notification unit 46 is unnecessary, but the notification may be executed in the same manner as in the automatic restoration mode.

The output unit 48 outputs the restoration image generated by the restoration processing unit 44 to the display control section 24d, to display the restoration image on the display device 16, or provides the restoration image (data) to another module such as an obstacle detection module or a white line detection module, for example, to execute each detection processing.

Furthermore, although the block diagram shown in FIG. 3 is described with modules classified for each function, respective functions may be appropriately integrated or divided. For example, functions of the first restoration processing unit 44a and the second restoration processing unit 44b may be executed by one restoration processing unit.

Figure 7:
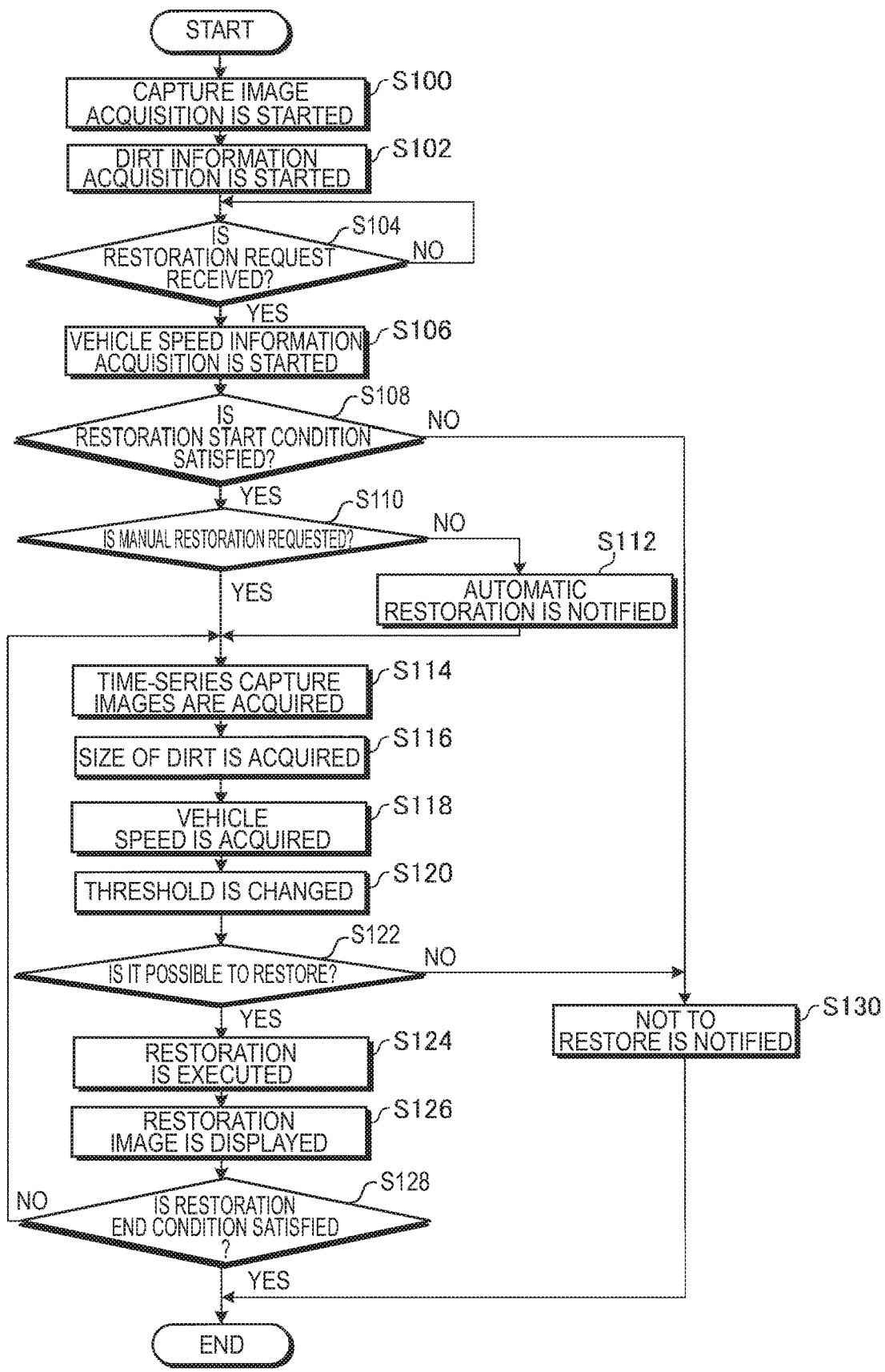
FIG. 7 is a flowchart showing an example of a flow of restoration processing of a restoration image in the periphery monitoring device according to the embodiment.

An example of a flow of restoration processing of a capture image by the periphery monitoring device (a periphery monitoring unit 34) configured as described above will be described with reference to a flowchart of FIG. 7. Furthermore, in the flowchart of FIG. 7, it is assumed that, for example, a rear image captured by the imaging unit 14b is selected as the capture image to be restored.

First, when the power supply of the vehicle 10 (ECU 24) is turned on, the image acquisition unit 38 operates the imaging units 14 to start acquisition of capture images (S100), to sequentially store the capture images in the capture image storage unit 56 of the RAM 24c. Then, the dirt information acquisition unit 40 starts acquisition of dirt information with respect to the capture image captured by the imaging unit 14 (S102). That is, the capture image is sequentially input into the dirt information learned model invoked from the dirt information learned model storage unit 50, and the dirt information indicating presence or absence of dirt and the size and position of dirt in a case where dirt is present is obtained.

Subsequently, the receiving unit 36 checks whether or not a restoration request signal is received (No in S104). For example, in a case where the user requests the generation of a restoration image via the operation input unit 20 or the like, or in a case where dirt is detected based on the dirt information acquired by the dirt information acquisition unit 40, the receiving unit 36 receives the restoration request signal (Yes in S104). When the receiving unit 36 receives the restoration request signal, the speed acquisition unit 42 starts acquisition of the current vehicle speed of the vehicle 10 (S106). Then, the restoration execution determining unit 44c determines whether or not a restoration start condition for restoring the capture image is satisfied in a current situation (S108). Specifically, the threshold changing unit 44c1 determines (changes) a threshold for determining whether or not the region concealed with the dirt can be restored based on the size of the dirt and the vehicle speed of the vehicle 10. The restoration execution determining unit 44c determines that the restoration start condition is satisfied in a case where the size of the dirt of the capture image to be restored is less than the threshold determined (changed) by the threshold changing unit 44c1 (Yes in S108), and the notification unit 46 determines whether or not the restoration processing is requested in the manual restoration mode (S110). In a case where the restoration processing is requested in the automatic restoration mode (No in S110), the notification unit 46 executes an automatic restoration notification for notifying the user that the restoration processing is performed automatically (S112). For example, a message indicating that the restoration image is displayed on the display device 16 is read from the ROM 24b or the like. In addition, a restoration execution flag provided to the obstacle detection module, the white line detection module, or the like is ON.

Subsequently, the restoration processing unit 44 acquires a plurality of time-series capture images 76 including the current latest capture image 76a and the past images 76b from the time-series capture images stored in the capture image storage unit 56 of the RAM 24c (S114). Subsequently, the restoration execution determining unit 44c acquires the size of the dirt 78 in the latest capture image 76a from the dirt information acquisition unit 40 (S116), and acquires the current vehicle speed of the vehicle 10 from the speed acquisition unit 42 (S118). Then, the threshold changing unit 44c1 refers to the threshold map read from the threshold data storage unit 55, and changes the threshold for determining whether or not the region concealed with the dirt 78 of the latest capture image 76a can be restored based on the size of the dirt 78 and the vehicle speed (S120). Then, in a case where the restoration execution determining unit 44c determines that the latest capture image 76a can be restored (Yes in S122), that is, in a case where the restoration condition is satisfied, the restoration processing unit 44 executes the restoration processing (S124), that is, the first restoration processing unit 44a inputs the capture images 76 that are captured in time series including the latest capture image 76a and the past images 76b into the first learned model 64 read from the first learned model storage unit 52, and generates the first restoration image 80. Subsequently, the second restoration processing unit 44b inputs the generated first restoration image 80 and the latest capture image 76a used for generating the first restoration image 80 into the second learned model 74 read from the second learned model storage unit 54, to generate a second restoration image 84. Then, the output unit 48 outputs the generated second restoration image 84 to the display control section 24*d* in a case where the display device 16 displays the generated second restoration image. In a case where obstacle detection processing or white line detection processing is being executed, the second restoration image 84 (restoration image data) is output to the obstacle detection module, the white line detection module, or the like (S126).

Then, the restoration execution determining unit 44*c* checks whether or not a restoration end condition that the receiving unit 36 receives an end request signal indicating the end of the restoration processing or the power supply of the vehicle 10 (ECU 24) is turned off is satisfied (S128). In a case where the restoration end condition is satisfied (Yes in S128), this flow ends. Furthermore, in this case, the periphery monitoring unit 34 displays unrestored capture images captured by the imaging units 14 on the display device 16 and notifies the obstacle detection module, the white line detection module, or the like of a message of providing unrestored capture image data (the restoration flag is OFF). In addition, in a case where the restoration end condition is not satisfied (No in S128), the process proceeds to S114, and the restoration processing by the restoration processing unit 44 is continued.

In addition, in S122, in a case where it is determined that the restoration of the region concealed with the dirt 78 in the latest capture image 76*a* cannot be sufficiently executed due to the change in the size of the dirt 78 or the change in the vehicle speed (No in S122), that is, in a case where the restoration condition is not satisfied, a notification indicating that restoration is impossible is performed via the display device 16 or the like (S130), and this flow is once ended. In addition, in S108, in a case where the restoration start condition is not satisfied (No in S108), the process proceeds to S130, the restoration impossible notification is performed, and this flow is once ended. Then, the flowchart shown in FIG. 7 is an example, and order and contents of the processing may be changed as long as the region concealed with dirt in the same capture image and the area can be restored.

As described above, according to the periphery monitoring device (the periphery monitoring unit 34) of the present embodiment, a plurality of time-series capture images captured while the vehicle is moving are input into the learned model, and the restoration image is generated, and thus, it is possible to provide a restoration image that is closer to a real-world environment situation. As a result, it is possible to improve the quality of information provided for periphery monitoring and improve periphery monitoring accuracy.

Furthermore, in the above-described embodiment, whether or not the restoration processing can be executed is determined based on the threshold determined (changed) based on the size of the dirt 78 and the vehicle speed of the vehicle 10, but the threshold may be changed in consideration of a steering angle, an acceleration or the like of the vehicle 10, for example. For example, there is consideration of a case where it is detected that the vehicle 10 is changing a direction greatly based on the detection value of the steering angle sensor 28. In this case, even in a case where the size of the dirt is large or a case where the vehicle speed is low, in the past images 76*b* obtained by tracing back in time series even in the region concealed with the dirt 78 in the latest capture image 76*a*, there is a high possibility that the region is not concealed with the dirt 78. The same applies in a case where the vehicle 10 is accelerated. Therefore, by using steering angle information and acceleration information, the threshold can be optimized and the restoration processing can be executed more appropriately. In addition, the threshold may be changed in consideration of the position information of the vehicle 10 that can be acquired from the information acquisition unit 30 or weather information of the place where the vehicle 10 is present. For example, in a case where it is determined that the number of raindrops on the capture image 76 is extremely large due to heavy rain, even in a case where the size of each dirt (raindrop) is small, the threshold may be changed so that the restoration processing is not executed.

In addition, in the above-described embodiment, for example, with respect to the rear image, an example restored such that dirt is not present is shown, but with respect to other capture images, for example, a front image, a right side image, and left side image, the restoration processing can be executed by the same processing and the same effect can be obtained. In addition, the restoration processing of the present embodiment can be applied to a composite image such as a bird's-eye view image, and the same effect can be obtained. In this case, the capture image or the composite image to be restored may be designated by the operation input unit 20 or the like, or may be automatically selected according to the image displayed on the display device 16 or the image data used for periphery monitoring.

A periphery monitoring program for restoration processing executed by the periphery monitoring unit 34 (CPU 24*a*) of the present embodiment is a file in an installable format or an executable format and may be configured to be recorded on a computer-readable recording medium such as a CD-ROM, a flexible disk (FD), a CD-R, a digital versatile disk (DVD).

Further, the periphery monitoring program may be configured to be stored on a computer connected to a network such as the Internet and to be provided by being downloaded via the network. In addition, the periphery monitoring program that is executed in the present embodiment may be configured to be provided or distributed via a network such as the Internet.

While the embodiments and modification examples of this disclosure have been described, these embodiments and modification examples are presented as examples and are not intended to limit the scope of the embodiments disclosed here. These novel embodiments can be implemented in various other forms, and various omissions, substitutions, and modifications can be made without departing from the scope of the embodiments disclosed here. These embodiments and modifications are included in the scope and the gist of the embodiments disclosed here, and are included in the claims and the equivalent scope thereof.

In the periphery monitoring device according to the embodiment of this disclosure, the restoration processing unit may input the first restoration image and the latest capture image into a second learned model and may restore a second restoration image as the restoration image, the second learned model being a result obtained by machine learning a relationship between a restoration image generated by inputting a plurality of second learning dirt images in each of which the learning dirt is present into the first learned model and a latest learning dirt image among the plurality of second learning dirt images used when restoring the restoration image. According to this configuration, for example, a second restoration image is generated by executing restoration processing again using the second learned model by using the first restoration image that is restored once using the first learned model and the latest capture image among the plurality of capture images used when generating the first restoration image. As a result, a latest surrounding situation can be reflected in the second restoration image, and an image quality of the second restoration image can be improved.

In the periphery monitoring device according to the embodiment of this disclosure, the restoration processing unit may acquire dirt information indicating a size of the dirt present in the latest capture image, and in a case where the size of the dirt indicated by the dirt information is equal to or greater than a predetermined threshold, may not execute restoration processing. According to this configuration, for example, in a case where the size of the dirt is too large, it is possible to avoid providing an inaccurate restoration image in which the region concealed with the dirt cannot be restored.

In the periphery monitoring device according to the embodiment of this disclosure, the restoration processing unit may acquire speed information of the vehicle at the time when the acquisition unit acquires the capture image, and may change the threshold according to a vehicle speed indicated by the speed information. According to this configuration, for example, in a case where a moving speed of the vehicle is high even in a case where the size of the dirt is large, a possibility that the region concealed with the dirt in the latest capture image is photographed in the past images obtained by tracing back in time series increases. On the other hand, in a case where a moving speed of the vehicle is low even in a case where the size of the dirt is small, even though the past images obtained by tracing back in time series are referred to, a possibility that the region concealed with the dirt in the latest capture image remains concealed increases. Therefore, it is possible to more appropriately determine whether or not the restoration processing can be executed by changing the threshold according to the vehicle speed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A periphery monitoring device comprising:
at least one processor configured to implement:
an acquisition unit that acquires a plurality of capture images which are captured by an imaging unit in time series when a vehicle is moving, the imaging unit being provided in the vehicle and capable of imaging surroundings of the vehicle; and
a restoration processing unit that, in a case where dirt is present in a latest capture image among the plurality of capture images, inputs the plurality of capture images into a first learned model and generates a first restoration image as a restoration image obtained by restoring a region concealed with the dirt in the latest capture image, the first learned model being a result obtained by machine learning a relationship between a first learning image in which learning dirt is not present and a plurality of first learning dirt images each of which is made by causing the learning dirt to be present in the first learning image.

2. The periphery monitoring device according to claim 1, wherein
the restoration processing unit inputs the first restoration image and the latest capture image into a second learned model and restores a second restoration image as the restoration image, the second learned model being a result obtained by machine learning a relationship between a restoration image generated by inputting a plurality of second learning dirt images in each of which the learning dirt is present into the first learned model and a latest learning dirt image among the plurality of second learning dirt images used when restoring the restoration image.

3. The periphery monitoring device according to claim 2, wherein
the restoration processing unit acquires dirt information indicating a size of the dirt present in the latest capture image, and in a case where the size of the dirt indicated by the dirt information is equal to or greater than a predetermined threshold, does not execute restoration processing.

4. The periphery monitoring device according to claim 3, wherein
the restoration processing unit acquires speed information of the vehicle at the time when the acquisition unit acquires the capture image, and changes the threshold according to a vehicle speed indicated by the speed information.

5. The periphery monitoring device according to claim 1, wherein
the restoration processing unit acquires dirt information indicating a size of the dirt present in the latest capture image, and in a case where the size of the dirt indicated by the dirt information is equal to or greater than a predetermined threshold, does not execute restoration processing.

6. The periphery monitoring device according to claim 5, wherein
the restoration processing unit acquires speed information of the vehicle at the time when the acquisition unit acquires the capture image, and changes the threshold according to a vehicle speed indicated by the speed information.

* * * * *